United States Patent
Müller

[11] 3,865,258
[45] Feb. 11, 1975

[54] CONVEYING AND STACKING SYSTEM FOR ARTICLES

[75] Inventor: Friedhelm Müller, Dortmund-Wickede, Germany

[73] Assignee: Holstein & Kappert Machinenfabrik Phonix GmbH, Dortmund, Germany

[22] Filed: Mar. 7, 1973

[21] Appl. No.: 338,971

[30] Foreign Application Priority Data
Mar. 11, 1972 Germany.............................. 2211793

[52] U.S. Cl................ 214/6 H, 214/6 P, 214/8.5 F
[51] Int. Cl........................ B65g 57/10, B65g 59/02
[58] Field of Search.......... 214/6 P, 6 G, 6 H, 6 BA, 214/6 DK, 8.5 R, 8.5 A, 8.5 F; 198/35

[56] References Cited
UNITED STATES PATENTS

| | | |
|---|---|---|
| 2,508,861 | 5/1950 | Jessen.............................. 214/8.5 F |
| 3,278,048 | 10/1966 | Bruce................................... 214/6 P |
| 3,389,810 | 6/1968 | Wolfe et al........................... 214/6 P |
| 3,477,201 | 11/1969 | Small................................ 214/6 H X |
| 3,520,422 | 7/1970 | Bruce et al......................... 214/6 P |
| 3,543,949 | 12/1970 | Weier............................... 214/8.5 F |
| 3,724,686 | 4/1973 | Nelson............................. 214/8.5 F |

Primary Examiner—Robert J. Spar
Assistant Examiner—Leslie J. Paperner
Attorney, Agent, or Firm—Michael S. Striker

[57] ABSTRACT

A conveying system has a conveyor which conveys articles in a predetermined path, and laterally of this conveyor there is arranged a platform which can be raised to and lowered from the level of the conveyor. Extending between the platform and the conveyor is an assembly station where articles being conveyed are assembled during transfer between the conveyor and the platform, or vice versa, and an arrangement is provided which engages the articles and pushes them off and on the assembly station, as the case may be.

7 Claims, 4 Drawing Figures

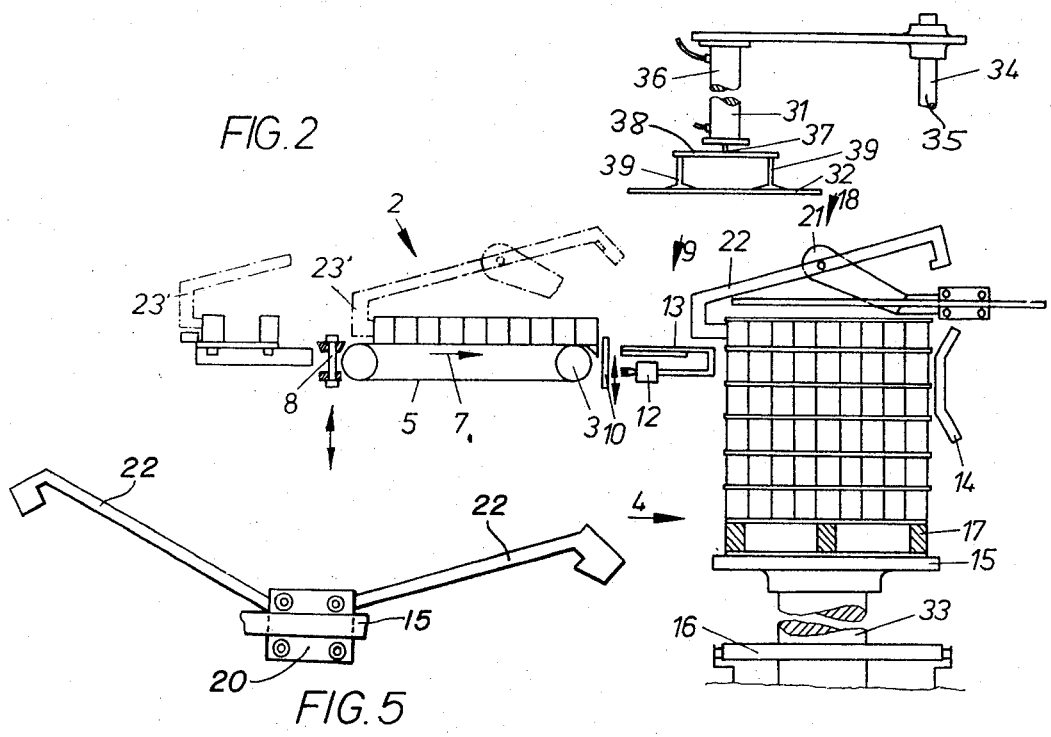
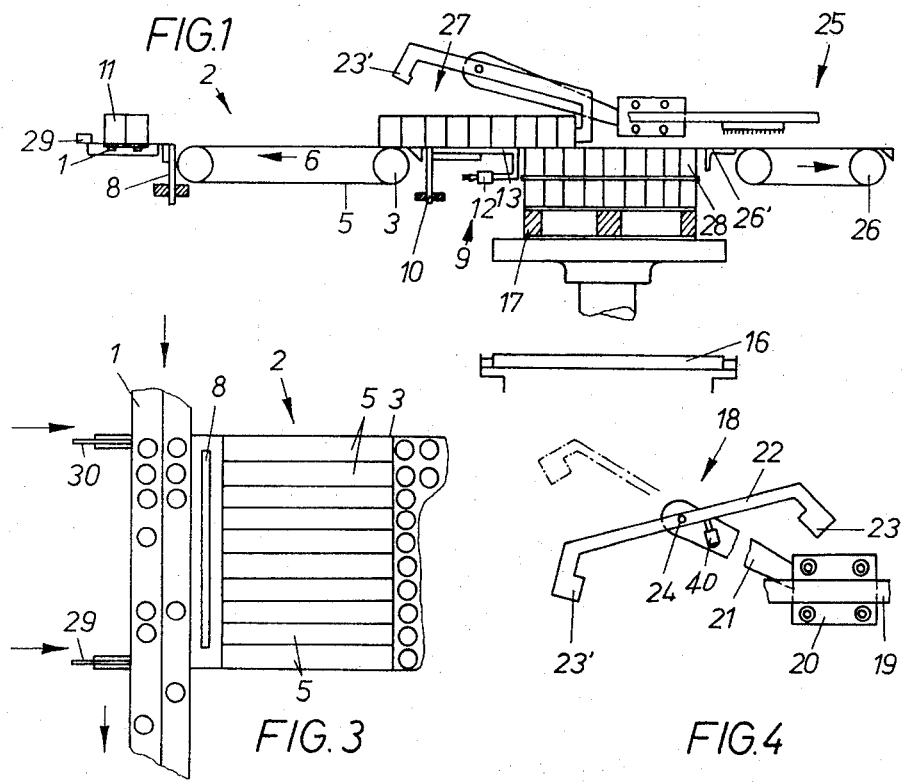

CONVEYING AND STACKING SYSTEM FOR ARTICLES

BACKGROUND OF THE INVENTION

The present invention relates generally to a conveying system, and more particularly to a system for conveying of articles of various types.

There are instances where articles must be conveyed from one user to another. This is particularly true in installations where such receptacles as bottles, cans or the like must be conveyed between respective machines. For this purpose it is of course known to utilize conveyors which, depending upon the conveying capacity required of them, may be single-track or multiple-track conveyors. In such applications there are many different types of machines involved between which the articles must be conveyed, and it is not always possible for all machines to have the same throughput capacity per unit of time. As a result, it is well known that in such installations breakdowns or malfunctions are a relatively frequent occurrence. This means, of course, that when one of the machines malfunctions or breakdowns, the following machines to which the articles (e.g., containers) are to be forwarded, must also be shut down. What is more, it is also necessary to shut down or at least reduce the speed of operation of any machines which supply such articles to the one that is malfunctioning.

Evidently, this presents problems. The industry has attempted to overcome these problems —assuming that the malfunction or breakdown is of only relatively brief duration— by making the conveyors which connect the various machines, of multiple-track type so that they can in effect act as "buffer" units. These conveyors utilize a plurality of adjacent chains having individual plates mounted thereon on which the articles are deposited. The chains are provided with individual drives, and each chain or set of chains carrying a set of plates constitutes one track of the conveyor. Above the upper level of the conveyor there are provided channeling elements which may be provided with automatic controls, the latter responding to displacement of the channeling elements by shutting down or starting up the individual tracks of the conveyor.

With such conveyors it is attempted to avoid having to shut down machines which supply articles to a malfunctioning or broken-down machine of the system, by having the machines continue their feeding of articles but shunting the articles on the individual tracks of these buffer conveyors where they are then assembled and stored until the broken-down or malfunctioning machine can again receive articles for further processing.

The trouble with this prior-arrangement is that the physical space required for its installation is rather large, and that there are often situations where that much space is simply not available. Moreover, this type of arrangement is quite complicated and expensive, not to mention that it also is prone to malfunctioning.

SUMMARY OF THE INVENTION

It is, accordingly, an object of the present invention to overcome the disadvantages of the prior art.

More particularly it is an object of the present invention to provide an improved conveying system which avoids these disadvantages.

Still more particularly it is an object of the invention to provide such an improved conveying system which can provide both for the assembly and holding-in-readiness of articles, and has a buffer storage capacity.

Another object of the invention is to provide such a system which can be used not only for the aforementioned purposes, but also for loading and unloading of articles onto or from pallets, and especially pallets having articles thereon arranged in superimposed layers which are separated by separators.

In keeping with these objects, and others which will become apparent hereafter, one feature of the invention resides in a conveying system which, briefly stated, comprises first means for conveying articles in a path and a second means laterally spaced from this path and operative for raising and lowering of articles to and from the level of said path. Third means is provided intermediate the first and second means for assembling batches of articles which are to be transferred to one of the first and second means, and fourth means is provided for transferring articles between the first, second and third means.

the arrangement according to the present invention provides not only for the assembly of articles in readiness for transfer to the first means or the second means, but also acts as a buffer storage unit for the purposes outlined earlier.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accomapnying drawing.

BRIEF DESCRIPTION OF THE DRAWING

FIG. 1 is somewhat diagrammatic partially sectioned side view of an apparatus according to the present invention, in one operative position;

FIG. 2 is a view similar to FIG. 1 but showing the apparatus in another operative position;

FIG. 3 is a top-plan view of FIG. 1; and

FIG. 4 is a side view of a detail of the apparatus in FIGS. 1-

FIG. 5 is a view analogous to FIG. 4, but illustrating a different embodiment.

DESCRIPTION OF THE PREFERRED EMBODIMENTS

Discussing the drawing now in detail it will be noted that FIGS. 1—4 illustrate an exemplary embodiment of an apparatus according to the present invention. The apparatus utilizes an endless conveyor 1, for instance a belt, a chain conveyor or the like, and an assembly station 2 which is capable of moving articles towards and away from the conveyor 1, more or less normal to the direction in which conveyor 1 conveys the articles. Station 2, which is here also configurated in the illustrated embodiment as a conveyor, has two ends, one of which is identified with reference numeral 3 and is remote from the conveyor 1. Adjacent the end 3 of the station 2 there is provided a platform which can be raised and lowered and is designated with reference numeral 4. The platform 4 is steered by a hydraulic cylinder 33 in dependence on the arm 22. As soon as the arm 22 has reached its final position (see FIG. 2) an impulse is given by known electric control elements to actuate the hydraulic cylinder 33. Details of the platform are not believed to be necessary for an understanding of the invention.

The station 2 may be in form of several adjacent tracks 5 (see FIG. 3) which may be in form of belts or chains carrying a series of plates on them. This is also known in the art. Depending upon the requirements of a given operation, the station 2 may convey articles in the direction of the arrow 6 (see FIG. 1) or in the direction of the arrow 7 (see FIG. 2). Intermediate the conveyor 1 and the station 2 is a blocking arrangement 8 which serves additionally as a guide rail, and a further blocking arrangement 10 is located intermediate the station 2 and the transfer point 9 where articles can be transferred to the platform 4. Both of the arrangements 8 and 9 can be moved into and out of the path of articles 11.

The transfer point 9 utilizes an angled member 13 which can be moved by an adjusting arrangement 12 in such a manner that it can be pressed against the layer of articles 11 on the platform 4 (see FIG. 1). A centering member 14 serves to support such layers of articles from the side opposite the member 13 (see FIG. 2).

The platform 4 is provided with a supporting member 15 which can be raised and lowered and which supports pallets 17 on which in turn layers of articles 11 are supported, with individual layers being separated by separators (see FIGS. 1 and 2). The platform 4 may be combined with a roller conveyor 16 (diagrammatically indicated in FIGS. 1 and 2) from which it receives the pallets 17.

Mounted above the station 2, the transfer point 9 and support 15 there is provided a transfer arrangement 18 which is movable in an approximately horizontal plane. FIG. 4 shows in particular the arrangement 18 which is movable in an approximately horizontal plane. FIG. 4 shows in particular that the arrangement 18 comprises a carriage 20 which is guided on a traverse 19 and provided with a projecting support member 21 that can be fixedly or displaceably mounted on the carriage 20. Mounted on the member 21 in turn is an arm 22 which is pivoted at 24 and is provided at its opposite ends with engaging portions 23, 23'.

In the illustrated embodiment there is another conveyor 26 provided at a side of the platform 4 which is remote from the station 2. The purpose of the conveyor 26 is, for instance, to be able to withdraw certain types of articles —for instance new containers— which are not to become intermixed with the normal flow of articles. An angled member 26' is provided, bridging the distance between layers of articles or another pallet 17 and the conveyor 26, and which can be moved against a layer 28 which is below layer 27 that is to be removed, in the same manner as this is done with the member 13.

In operation of the novel system, and assuming that all machines with which the system cooperates are operating properly, the individual articles on the conveyor 1 are continuously advanced in the path of the conveyor. The rail 8 in conjunction with a rail 29 which is inclined in the direction shown in FIG. 3, acts as a guide for the articles 11 advancing on the conveyor 1 past the station 2.

If, now, a machine located downstream of the station 2 as seen with reference to the direction of advancement of the conveyor 1, requires fewer or more of the articles 1, then the rail 29 interrupts the supply of articles on the conveyor 1 to that machine, by extending across the particular track of the conveyor 1 on which the articles for that machine are travelling. At the same time the rail 8 is lowered. This means that all of the articles which are now prevented from moving towards the machine as the still traveling conveyor 1 will, on contact with rail 19, slip along the rail 29 and move transversely of the conveyor 1 towards the station 2, which they can reach due to the lowering of the rail 8. The rail arrangement 10 of the station 2 is in blocking position so that the articles will accumulate on the station 2. As soon as a requisite number of articles 11 has been accumulated on the station 2, for instance enough articles to make up one of the layers that can be accommodated on the pallet 17, the unit 18 moves into position shown in FIG. 2, and in particular the engaging portion 23 moves to the position which is illustrated in broken lines in FIG. 2. Now, the rail 10 is lowered and the carriage of the unit 18 moves towards the right in FIG. 2 or by the portion 23' which is located behind the articles 11, pushes the same onto the support 15 or on the pallet 17 thereon or on the separator 32 which covers an already existing layer of articles on the pallet 17.

As this takes place, a further rail or blocking arrangement 30 is also in blocking position but opens as soon as the portion 23' has moved laterally of the conveyor 1, so that additional articles 11 can advance on the conveyor 1 even while articles are being pushed off the same intermediate the rails 29 and 30 and onto the station 2. In the meantime the rail 10 also has been closed again and at the same time the platform 4 descends by a distance corresponding to the height of one of the layers on the pallet 17. Above the support 15 of the platform 4 is provided a separator depositing arrangement 31 of known construction which, as soon as the platform 4 has descended by the requisite amount, moves down and deposits a separator (for instance a layer of cardboard) 32 onto the layer of articles 11 that has just been deposited. The separator depositing arrangement 31 which is arranged over the platform 4 is arranged swivel mounted in a horizontal plane round an axis of rotation 34. The axis of rotation is tightly connected to the frame of the machine. The axis of rotation contains an arm 35 which carries a variable cylinder 36. The piston-rod 37 thereof carries a support 38 with grippers 39 being able to grip a pasteboard-layer 32. The removing, respectively the putting on, of the pasteboard-layers is performed manually. The next series of articles, already engaged by the end portion 23', can now be transferred onto the newly-deposited separator 32, and these operations can be repeated until a desired number of layers of articles has been formed on the pallet 17, whereupon the platform 4 can be lowered until the pallet 17 with its contents can be moved onto the roller conveyor 16, whereupon a new pallet is placed on the platform 4 and the latter is raised so that the loading of the new pallet can begin.

Conversely, if a machine located ahead of the station 2 is supplying none or not enough articles 11, then the articles on the pallet or pellets 17 are used to make up for this deficiency. It is now necessary to unload in the reverse manner onto the station 2 and from there onto the conveyor 1. In this case the end portion 23 is engaged with each layer of articles on a pallet (see FIG. 1) in response to pivoting of the arm 22, and the layer (for instance the layer 27) is pushed onto the station 2 by movement of the carriage 20 in the direction towards the conveyor 1. The station 2 at this time advances in the direction of the arrow 6 and the articles 11 deposited on it advance with it towards the conveyor 1, with the rail 8 having been retracted. On the conveyor 1 they are then conveyed to the next machine. As soon as the supply of articles from the preceding machine is resumed, the rail 30 is briefly moved to closed position in order to permit the remainder of the partially fed-in layer (e.g., layer 27) to be recovered by moving the carriage 20 and pivoting the arm 22 so that its end portion 23' engages behind the remaining articles of the layer and can place them back onto the station 2 from where they are then returned to the platform 4. Thereupon the rail 8 is moved to closed position and normal flow of articles on the conveyor 1 is resumed. The single rails 8, 10, 29, 30 are opened during the removing process. During the loading process the rails 8, 10 are actuated automatically by not shown light barriers in dependence upon the position of the carriage 20 and the respective position of the arm 22. The arm 22 is brought into its position by adjusting means 40, also in dependence on the position of the carriage 20.

It will be appreciated that the conveyor 1 can also be associated as a bypass with the respective system, and can be part of a conveyor arrangement of for instance a bottle cleaning machine which supplies cleaned bottles to a filling machine. The bottle cleaning machine in many instances has a higher throughput capacity per unit of time than the filling machine, so that the excess cleaned bottles can be "buffered," that is stored in this manner, and can be fed to the filling machine at a desired rate.

It will be appreciated that various modifications can be made in the illustrated embodiment without departing at all from the concept of the invention. For instance, to name one possibility, as shown in FIG. 5, the device 18 can utilize a carriage 20 having two arms 22 having engaging portions which are spaced from one another by approximately the distance corresponding to the width of one of the layers of articles and which can be raised and lowered in vertical direction so that they are located at opposite sides of such a layer when in lowered condition. Another possibility would be to have rails or chains located above the station 2, the conveyor 1 and the platform 4, and to have rear arms mounted on these chains and advance on them so that they would perform the function of the arm 22.

It will be understood that each of the elements described above, or two or more together, may also find a useful application in other types of constructions differing from the types described above.

While the invention has been illustrated and described as embodied in a conveying system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims:

What is claimed as new and desired to be protected by Letters Patent is set forth in the appended

1. A conveying system, comprising first means for conveying articles in a path; second means laterally spaced from said path and operative for raising and lowering of articles to and from the level of said path; third means intermediate said first and second means for assembling batches of articles which are to be transferred to one of said first and second means; and fourth means for transferring articles said first, second and third means, said fourth means comprising an arm pivotable about a horizontal axis above said level and having spaced ends each provided with an engaging portion respectively adapted in dependence upon pivoting of said arm to move behind respective articles to be transferred at a side thereof which is opposite the direction of transfer, and moving means for moving said arm with reference to said first, second and third means so as to effect transfer of the engaged articlles.

2. A conveying system as defined in claim 1, wherein said first means comprises an endless conveyor.

3. A conveying system as defined in claim 1, wherein said second means comprises a vertically displaceable platform.

4. A conveying system as defined in claim 1, wherein said first means comprises a belt conveyor.

5. A conveying system as defined in claim 1, wherein said third means comprises an endless conveyor.

6. A conveying system as defined in claim 1, wherein said moving means comprises a displaceable carriage, and said fourth means comprises an additional pivotable arm, both arms being provided on said carriage spaced from one another and individually insertable behind respective articles at a side thereof opposite the direction of intended transfer.

7. A conveying system as defined in claim 6, wherein said arms are insertable by being raised and lowered with reference to the articles.

* * * * *